United States Patent
Risko Cattell et al.

(10) Patent No.: US 12,395,025 B2
(45) Date of Patent: Aug. 19, 2025

(54) DIRECT LIQUID COOLING SYSTEMS AND METHODS FOR MAGNETS OF INTERIOR PERMANENT MAGNET ELECTRIC MACHINES

(71) Applicant: GM GLOBAL TECHNOLOGY OPERATIONS LLC, Detroit, MI (US)

(72) Inventors: Rebecca K. Risko Cattell, Royal Oak, MI (US); Edward L. Kaiser, Orion, MI (US); Matthew J. Bozich, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 274 days.

(21) Appl. No.: 18/299,229

(22) Filed: Apr. 12, 2023

(65) Prior Publication Data
US 2024/0348117 A1 Oct. 17, 2024

(51) Int. Cl.
| | |
|---|---|
| H02K 1/32 | (2006.01) |
| B60K 1/00 | (2006.01) |
| B60K 11/02 | (2006.01) |
| H02K 1/276 | (2022.01) |
| H02K 9/19 | (2006.01) |
| H02K 21/14 | (2006.01) |

(52) U.S. Cl.
CPC ............. *H02K 1/32* (2013.01); *B60K 1/00* (2013.01); *H02K 1/276* (2013.01); *H02K 9/19* (2013.01); *H02K 21/14* (2013.01); *B60K 2001/006* (2013.01); *B60K 11/02* (2013.01)

(58) Field of Classification Search
CPC .................................. H02K 1/32; H02K 9/19
USPC ............................................................ 310/54
See application file for complete search history.

(56) References Cited

U.S. PATENT DOCUMENTS

| | | | |
|---|---|---|---|
| 2,990,508 A | 6/1961 | Thompson | |
| 5,166,568 A | 11/1992 | Nystuen et al. | |
| 6,163,127 A | 12/2000 | Patel et al. | |
| 6,674,205 B2 | 1/2004 | Biais et al. | |
| 6,687,974 B1 * | 2/2004 | Asao ................. | H02K 1/16 |
| | | | 310/179 |
| 7,969,058 B2 | 6/2011 | Rahman et al. | |
| 8,120,223 B2 | 2/2012 | Leonardi et al. | |
| 8,138,651 B2 | 3/2012 | Rahman et al. | |
| 8,174,158 B2 | 5/2012 | Rahman et al. | |

(Continued)

*Primary Examiner* — Terrance L Kenerly
*Assistant Examiner* — Theodore L Perkins
(74) *Attorney, Agent, or Firm* — Quinn IP Law (57) ABSTRACT

Presented are direct liquid cooling systems for regulating magnet temperature of electric machines, methods for making/using such systems, and motor vehicles equipped with traction motors having magnets cooled by such systems. An electric machine includes a stator assembly that is located inside a protective outer housing. The stator assembly includes one or more electromagnetic windings mounted onto a stator core. A rotor assembly is rotatably attached to the housing, coaxial with and spaced from the stator assembly. The rotor assembly includes one or more permanent magnets mounted to a rotor core. The rotor core includes one or more radially elongated feed grooves that are fluidly connected to one or more axially elongated feed channels. The rotor feed groove(s) fluidly connect to a direct liquid cooling system to receive therefrom a liquid coolant. Each rotor feed channel transports the liquid coolant into direct contact with a target surface of a magnet.

20 Claims, 4 Drawing Sheets

(56) References Cited

U.S. PATENT DOCUMENTS

| | | |
|---|---|---|
| 8,492,952 B2 | 7/2013 | Bradfield |
| 8,928,197 B2 | 1/2015 | Jurkovic et al. |
| 8,933,606 B2 | 1/2015 | Rahman et al. |
| 9,035,522 B2 | 5/2015 | Liang et al. |
| 9,712,005 B2 | 7/2017 | Rahman et al. |
| 11,025,116 B2 | 6/2021 | Yao et al. |
| 2006/0017345 A1 | 1/2006 | Uchida et al. |
| 2007/0216249 A1 | 9/2007 | Gruendel et al. |
| 2009/0045688 A1 | 2/2009 | Liang et al. |
| 2010/0244610 A1 | 9/2010 | Hao et al. |
| 2011/0062902 A1 | 3/2011 | Patel et al. |
| 2011/0109180 A1 | 5/2011 | Akutsu et al. |
| 2011/0169363 A1 | 7/2011 | Summers et al. |
| 2011/0198962 A1 | 8/2011 | Tang |
| 2013/0147303 A1 | 6/2013 | Kaiser et al. |
| 2013/0270952 A1 | 10/2013 | Jurkovic et al. |
| 2013/0334912 A1* | 12/2013 | Tokunaga ............... H02K 9/19 310/54 |
| 2014/0252903 A1 | 9/2014 | Rahman et al. |
| 2016/0322874 A1* | 11/2016 | Yoshinori ............... H02K 1/32 |
| 2017/0012503 A1* | 1/2017 | Okochi ................... H02K 1/32 |
| 2018/0006532 A1 | 1/2018 | Sung |
| 2020/0195071 A1 | 6/2020 | Fatemi et al. |
| 2020/0259380 A1* | 8/2020 | Ikemoto ................. H02K 1/32 |
| 2022/0131431 A1 | 4/2022 | Coppola et al. |
| 2022/0399771 A1* | 12/2022 | Jelinewski ............. H02K 9/19 |
| 2023/0011641 A1 | 1/2023 | Keum |
| 2023/0046826 A1 | 2/2023 | Keum |

\* cited by examiner

DIRECT LIQUID COOLING SYSTEMS AND METHODS FOR MAGNETS OF INTERIOR PERMANENT MAGNET ELECTRIC MACHINES

INTRODUCTION

The present disclosure relates generally to electric machines. More specifically, aspects of this disclosure relate to direct liquid cooling systems for interior permanent magnet (IPM) electric motors.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and being relatively inexpensive, light weight, and overall efficient. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, rechargeable battery cells, and battery cooling and charging hardware in a battery-based FEV. Hybrid-electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

There are three primary types of electric machines used for traction motors in modern electric-drive vehicle powertrains: brushless direct current (BLDC) permanent magnet (PM) motors, brushless asynchronous alternating current (AC) motors, and multiphase synchronous ACPM motors. An ACPM traction motor is an electric machine that converts electrical energy into rotational mechanical energy using a stator with multiphase electromagnetic windings, such as electrically conductive "hairpin" bars, and a rotatable rotor that bears an engineered pattern of magnets, such as surface-mounted or interior-mounted permanent magnets. Rotation of the rotor is effected by a magnetic field that is produced by the flow of current through the stator windings and interacts with a magnetic field produced by the rotor-borne magnets. Permanent magnet motors have a number of operating characteristics that make them more attractive for use in vehicle propulsion applications when compared to their available counterparts, including high efficiency, high torque, high power densities, and a long constant-power operating range.

The rotor assemblies for many modern-day ACPM motors are fabricated with a rotor core that is formed from thin ferromagnetic discs that are stacked and laminated together into a cylindrical body. Each rotor disc has several openings that, when aligned with the openings of neighboring discs, form rotor slots that extend axially through the length of the rotor core. Persistent-state magnetic elements, such as permanent magnet bars, are inserted into the rotor core and secured within these rotor slots. The rotor core may be mounted onto a motor shaft for outputting propulsion-generating motor torque produced by the motor or for inputting electricity-generating regenerative torque received by the motor. During operation of the motor assembly, the internal electrical and electromagnetic hardware may generate a significant amount of heat, e.g., due to windage, friction, and hysteresis losses. An integrated motor cooling system may be employed to prevent undesirable overheating conditions within the motor. Active thermal management (ATM) systems, for example, employ a central controller or dedicated control module to regulate the operation of a cooling circuit that circulates coolant fluid through the heat-producing motor components. For indirect liquid cooling systems, a heat-transfer coolant is circulated through a network of internal channels and pipes within the motor housing. In contrast, direct liquid cooling systems—or "liquid immersion cooling" (LIC)—immerse the motor stator and windings within a direct-conduction dielectric liquid coolant.

SUMMARY

Presented herein are direct liquid cooling systems for permanent magnets of electric machines, methods for making and methods for operating such cooling systems, and motor vehicles equipped with IPM traction motors having rotor-encased permanent magnets cooled by such systems. By way of example, a multiphase ACPM motor contains a PM-bearing rotor assembly with a rotor core that is formed from a laminated stack of ferromagnetic discs. These stacked discs collectively define axially elongated rotor slots, which are arranged in sets of circumferentially spaced poles and secure therein discrete permanent magnets. The rotor core is keyed, splined, or otherwise drivingly engaged to a motor shaft with a hollow core through which dielectric coolant fluid is fed into the rotor assembly. Front and rear rotor discs at proximal and distal ends of the rotor core stack include radially elongated coolant feed grooves that transmit coolant fluid—under the centrifugal forces of the spinning rotor—from the motor shaft core to axially elongated coolant feed channels that are coterminous with the rotor slots. Each coolant feed groove may have a Y-shaped geometry with a stem ("descender") that fluidly connects to the motor shaft core and two branches ("diagonal strokes") that each fluidly connects to a respective pair of PM rotor slots. To ensure a continuous and even feed of coolant to each rotor slot, the bottom end of the stem may have an enlarged base section for receiving fluid, and the top end of the stem may have an enlarged trough section for pooling coolant fluid. Coolant is fed from the front disc and through a first subset of the axially elongated feed channels in a rearward direction, whereas coolant is fed from the rear disc and through a distinct second subset of the axially elongated feed channels in a forward direction.

Attendant benefits for at least some of the disclosed concepts include direct liquid cooling systems with optimized coolant conduit architectures for direct-contact cooling of target surfaces of rotor-mounted permanent magnets. Disclosed designs enable liquid coolant to be fed directly to the PM slots in the rotor core laminations to contact the magnets with a concomitant reduction in magnet operating temperatures. The unique coolant feed design in the end discs may enable coolant to reach all of the magnet slots during motor operation such that coolant flows across the entire axial length of every magnet slot and, thus, every magnet contained therein. The Y-shaped coolant grooves in the end discs are engineered to direct coolant to both branches by allowing coolant to pool in a trough at the center of the groove. This enables one Y-shaped coolant feed groove to transmit a metered supply of coolant to each of four or more PM rotor slots, which simplifies coolant plumbing, reduces coolant charge volumes, and reduces packaging requirements.

Aspects of this disclosure present direct liquid cooling systems for regulating the operating temperatures of magnets in electric machines, such as motors, generators, transformers, inductors, dynamometers, converters, etc. According to an example, there is presented an electric machine that is cooled by a direct liquid cooling system, which is controller-operated to circulate liquid coolant, such as a thermally conductive dielectric oil, through the electric machine. The electric machine includes a protective outer housing, a stator assembly that is rigidly mounted inside the housing, and a rotor assembly that is rotatably attached to the housing, coaxial with and spaced from the stator assembly. The stator assembly includes a stator core with one or more electromagnetic windings, such as U-shaped copper hairpins, mounted to the stator core. The rotor assembly includes a rotor core with one or more magnets, such as hard-ferrite permanent magnets, mounted to the rotor core. The rotor core defines therein one or more radially elongated rotor feed grooves that are fluidly connected to one or more axially elongated rotor feed channels. The rotor feed groove(s) fluidly connect to a direct liquid cooling system to receive therefrom a liquid coolant. Each rotor feed channel receives liquid coolant from the feed groove(s) and transports the coolant into direct contact with a target surface of a magnet.

Additional aspects of this disclosure are directed to electric-drive vehicles with multiphase brushless ACPM traction motors that contain rotor-mounted magnets cooled via direct liquid cooling. As used herein, the terms "vehicle" and "motor vehicle" may be used interchangeably and synonymously to include any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles (ATV), motorcycles, farm equipment, watercraft, aircraft, etc. For non-automotive applications, disclosed concepts may be employed for any logically relevant use, including commercial or residential generators, turbines, pumping equipment, compressors, machine tools, alternators, etc. In an example, a motor vehicle includes a vehicle body with a passenger compartment, multiple road wheels mounted to the vehicle body (e.g., via corner modules coupled to a unibody or body-on-frame chassis), and other standard original equipment. For electric-drive vehicle applications, one or more electric traction motors operate alone (e.g., for FEV powertrains) or in conjunction with an internal combustion engine assembly (e.g., for HEV powertrains) to drive one or more of the road wheels and propel the vehicle.

Continuing with the preceding discussion, a direct liquid cooling system is packaged within the vehicle body and selectively operable to circulate liquid coolant through the traction motor(s). Each traction motor includes a protective motor housing that is attached to the vehicle body and rigidly mounts therein a stator assembly. The stator assembly includes a cylindrical stator core with a hollow center and axially elongated stator slots through which extend multiple electromagnetic windings. Rotatably mounted inside the motor housing is a PM-bearing rotor assembly that is located in the hollow center of the stator core, coaxial with and separated by an airgap from the stator assembly. The rotor assembly includes a rotor core with a hollow center and axially elongated rotor slots, each of which mounts therein a respective permanent magnet. The rotor core includes radially elongated rotor feed grooves that are fluidly connected to axially elongated rotor feed channels. Each rotor feed groove is fluidly connected to the direct liquid cooling system to receive therefrom liquid coolant. Each rotor feed channel transports the received liquid coolant to a respective one of the rotor slots and into direct contact with a target surface of the permanent magnet contained in the respective one of the rotor slots.

Aspects of this disclosure are also directed to manufacturing workflow processes, system control logic, and computer-readable media (CRM) for operating or for producing any of the disclosed rotor assemblies, electric machines, and/or vehicles. In an example, a method is presented for assembling an electric machine. This representative method includes, in any order and in any combination with any of the above and below disclosed options and features: receiving a housing of the electric machine; mounting a stator assembly inside the housing, the stator assembly including a stator core and an electromagnetic winding mounted to the stator core; rotatably mounting a rotor assembly inside the housing such that the rotor assembly is coaxial with and spaced from the stator assembly, the rotor assembly including a rotor core and a magnet mounted to the rotor core, the rotor core defining therein a radially elongated rotor feed groove fluidly connected to an axially elongated rotor feed channel; and, fluidly connecting the rotor feed groove to the direct liquid cooling system to receive therefrom the liquid coolant, wherein the rotor feed channel transports the liquid coolant into direct contact with a target surface of the magnet.

For any of the disclosed electric machines, vehicles, and methods, each rotor feed groove may have a Y-shaped geometry with a pair of branches projecting radially outward from a radially outer end of a stem. In this instance, the stem has a radially inner end, opposite its radially outer end, through which liquid coolant is fed into the rotor assembly. Each feed groove branch may be fluidly coupled with and feed liquid coolant to a respective one of the feed channels. As another option, each rotor feed groove may include a coolant trough that is interposed between and fluidly connects the stem and two branches. The coolant trough has an enlarged (first) lateral width that is greater than a narrow (second) lateral width of the stem's radially outer end. In this instance, the stem may include a base, which is located at the stem's radially inner end, and a column, which connects the base to the stem's radially outer end. The base may have a variable (third) lateral width that is greater than a fixed (fourth) lateral width of the column. The stem branches may project at an oblique angle from the radially outer end of the stem. Additionally, the stem may be curvilinear and the branches may be arcuate.

For any of the disclosed electric machines, vehicles, and methods, the rotor core may include multiple radially elongated coolant feed grooves that are recessed into and circumferentially spaced around an end surface of the rotor core. Likewise, the rotor core may include multiple axially elongated coolant feed channels that are circumferentially spaced around and extend entirely through the rotor core. As another option, the rotor core may include a stack of rotor discs with a front (first) end disc at a front (first) end of the rotor stack. In this instance, a front (first) set of coolant feed grooves may be recessed into, circumferentially spaced around, and extend radially outward along a front (first) surface of the front (first) end disc. The rotor core may also include a rear (second) end disc at a rear (second) end of the rotor stack. In this instance, a rear (second) set of feed grooves may be recessed into, circumferentially spaced around, and extends radially outward along a rear (second) surface of the rear (second) end disc. The rotor core may include a pair of (first and second) sets of rectilinear feed channels that extend axially through the rotor stack; each set of rectilinear coolant feed channels is fluidly connected to a respective set of Y-shaped coolant feed grooves. A pair of (first and second) annular end plates may each abut a respective one of the end discs and, in so doing, cover open axial faces of the feed grooves in that respective end disc.

For any of the disclosed electric machines, vehicles, and methods, the rotor assembly may contain multiple permanent magnets and the rotor core may define therethrough multiple axially elongated rotor slots, each of which secures therein a respective one of the permanent magnets. In this instance, the rotor core may include multiple axially elongated feed channels, each of which fluidly connects to and is coterminous with a respective one of the rotor slots, e.g., such that liquid coolant flows across and contacts the entire axial length of the PM. A motor shaft may be drivingly connected to the rotor core to rotate in unison with the rotor assembly. In this instance, the motor shaft defines therein an axially elongated coolant feed core through which liquid coolant is received from the direct liquid cooling system and transmitted into the rotor assembly. Each rotor feed groove may be fluidly connected to the coolant feed core.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise. Moreover, recitation of "first", "second", "third", etc., in the specification or claims is not used to establish a serial or numerical limitation; rather, these designations may be used for ease of reference to similar features in the specification and drawings and to demarcate between similar elements in the claims.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Figure 1:
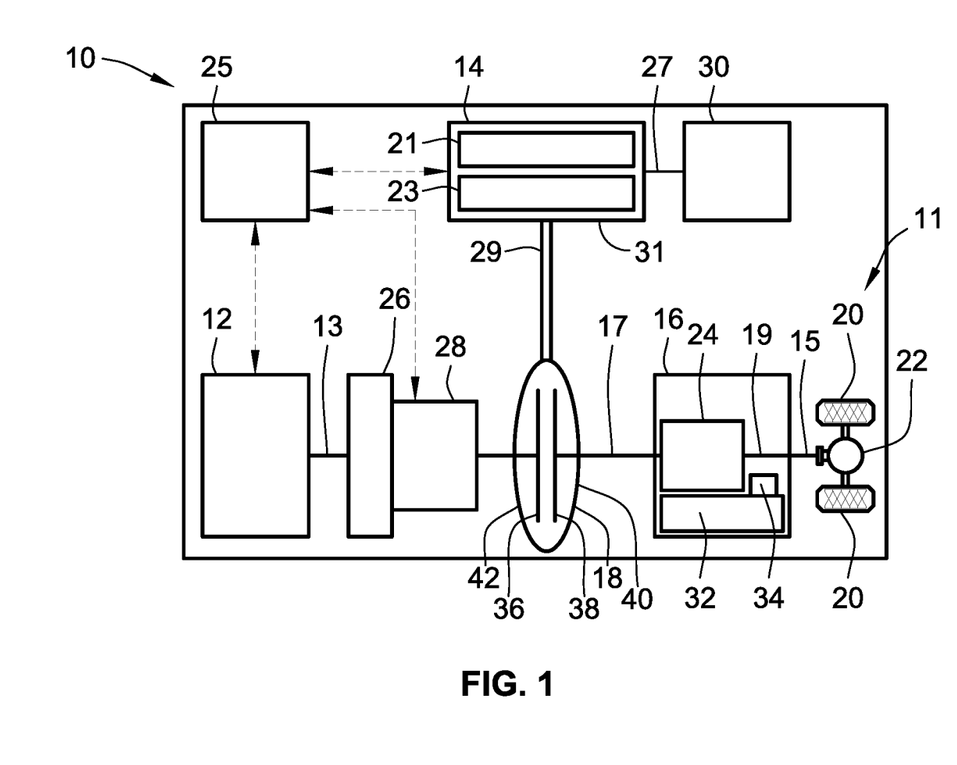
FIG. 1 is a schematic illustration of a representative electric-drive motor vehicle with a hybrid electric powertrain employing an internal combustion engine and an alternating-current, permanent magnet (ACPM) traction motor with which aspects of this disclosure may be practiced.

Referring now to the drawings, wherein like reference numbers refer to like features throughout the several views, there is shown in FIG. 1 a schematic illustration of a representative motor vehicle, which is designated generally at 10 and portrayed herein for purposes of discussion as an electric-drive passenger car with a parallel two-clutch (P2) hybrid-electric powertrain. The illustrated automobile 10—also referred to herein as "motor vehicle" or "vehicle" for short—is merely an exemplary application with which aspects of this disclosure may be practiced. In the same vein, incorporation of the present concepts into a hybrid electric powertrain should also be appreciated as a representative implementation of the inventive concepts disclosed herein. As such, it should be understood that aspects of this disclosure may be applied to other powertrain architectures, may be incorporated into any logically relevant type of motor vehicle, and may be utilized for both automotive and non-automotive applications alike. Lastly, only select components of the motor vehicles and electric machines have been shown and will be described in additional detail below. Nevertheless, the vehicles and machines discussed herein may include numerous additional and alternative features, and other available peripheral components, for carrying out the various methods and functions of this disclosure.

The representative vehicle powertrain system of FIG. 1 is shown with a prime mover—represented herein by a restartable internal combustion engine (ICE) assembly 12 and an electric motor/generator unit (MGU) 14—that drivingly connects to a driveshaft 15 of a final drive system 11 by a multi-speed automatic power transmission 16. The engine 12 transfers power, typically by way of torque via an engine crankshaft 13, to an input side of the transmission 16. Engine torque is first transmitted via the crankshaft 13 to rotate an engine-driven torsional damper assembly 26; transmitted engine torque is concurrently transferred through the torsional damper assembly 26 to an engine disconnect device 28. This engine disconnect device 28, when operatively engaged, transmits torque received from the ICE assembly 12, by way of the damper 26, to input structure of the torque converter (TC) assembly 18. As the name implies, the engine disconnect device 28 may be selectively disengaged to drivingly disconnect the ICE 12 from the motor 14, TC assembly 18, and transmission 16.

To propel the hybrid vehicle 10 of FIG. 1, a multispeed power transmission 16 is adapted to receive, selectively manipulate, and distribute tractive power output from the engine 12 and motor 14 to the vehicle's final drive system 11. The final drive system 11 is represented herein by a driveshaft 15, a rear differential 22, and a pair of rear drive wheels 20. The power transmission 16 and torque converter 18 of FIG. 1 may share a common transmission oil pan or "sump" 32 for supply of hydraulic fluid. A shared transmission pump 34 provides sufficient hydraulic pressure for the fluid to selectively actuate hydraulically activated elements of the transmission 16, the TC assembly 18 and, for some implementations, the engine disconnect device 28.

The ICE assembly 12 operates to propel the vehicle 10 independently of the electric traction motor 14, e.g., in an "engine-only" operating mode, or in cooperation with the motor 14, e.g., in "vehicle-launch" or "motor-boost" operating modes. In the example depicted in FIG. 1, the ICE assembly 12 may be any available or hereafter developed engine, such as a compression-ignited diesel engine or a spark-ignited gasoline or flex-fuel engine, which is readily adapted to provide its available power output typically at a number of revolutions per minute (RPM). Although not explicitly portrayed in FIG. 1, it should be appreciated that the final drive system 11 may take on any available configuration, including front wheel drive (FWD) layouts, rear wheel drive (RWD) layouts, four-wheel drive (4WD) layouts, all-wheel drive (AWD) layouts, six-by-four (6×4) layouts, etc.

FIG. 1 also depicts an electric motor/generator unit ("motor") 14 that operatively connects via a rotor shaft, motor support hub, or belt (collectively motor output member 29) to the hydrodynamic torque converter 18. The torque converter 18, in turn, drivingly connects the motor 14 to an input shaft 17 of the transmission 16. The electric motor/generator unit 14 is composed of a cylindrical stator assembly 21 circumscribing and concentric with a cylindrical rotor assembly 23. Electric power is provided to the stator 21 through a high-voltage electrical system, including electrical conductors/cables 27 that pass through the motor housing via suitable scaling and insulating feedthroughs (not illustrated). Conversely, electric power may be provided from the MGU 14 to an onboard traction battery pack 30, e.g., during a regenerative braking mode. Operation of any of the illustrated powertrain components may be governed by an onboard or remote vehicle controller or module or network of controllers/modules/devices, all variations of which are represented in FIG. 1 by a programmable electronic control unit (ECU) 25.

Power transmission 16 may use differential gearing 24 to achieve selectively variable torque and speed ratios between transmission input and output shafts 17 and 19, respectively. One form of differential gearing is the epicyclic planetary gear arrangement, which offers the advantage of compactness and different torque and speed ratios among members of the planetary gearing. Traditionally, hydraulically actuated torque establishing devices, such as clutches and brakes, are selectively engageable to activate the aforementioned gear elements for establishing desired forward and reverse speed ratios between the transmission's input and output shafts 17, 19. While envisioned as a 6-speed or 8-speed automatic transmission, the power transmission 16 may optionally take on other functionally appropriate configurations, including Continuously Variable Transmission (CVT) architectures, manual or automated-manual transmissions, etc.

Hydrodynamic torque converter assembly 18 of FIG. 1 operates as a fluid coupling for operatively connecting the engine 12 and motor 14 with the internal epicyclic gearing 24 of the power transmission 16. Disposed within an internal fluid chamber of the torque converter assembly 18 is a bladed impeller 36 facing a bladed turbine 38. The impeller 36 is juxtaposed in serial power-flow fluid communication with the turbine 38, with a TC stator (not shown) interposed between the impeller 36 and turbine 38 to selectively alter fluid flow therebetween. The transfer of torque from the engine and motor output members 13, 29 to the transmission 16 via the TC assembly 18 may be through stirring excitation of hydraulic fluid, such as transmission oil, inside the TC's internal fluid chamber caused by rotation of the impeller and turbine 36, 38 blades. To protect these components, the torque converter assembly 18 is constructed with a TC pump housing, defined principally by a transmission-side pump shell 40 that is fixedly attached to an engine-side pump cover 42 such that a working hydraulic fluid chamber is formed therebetween.

Figure 2:
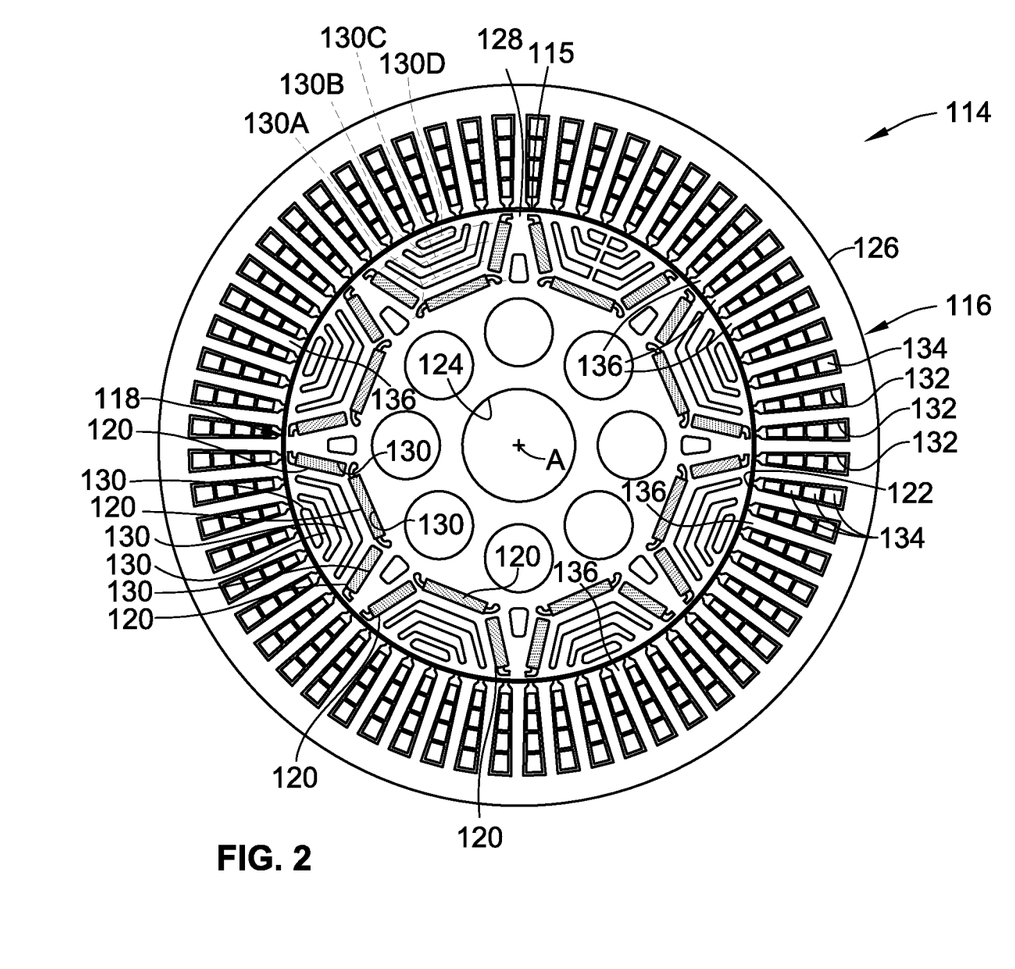
FIG. 2 is an end-view illustration of a representative interior permanent magnet (IPM) electric machine employing a hairpin-wound stator and a PM-bearing rotor with which aspects of this disclosure may be practiced.

FIG. 2 illustrates an example of an electric machine 114 that employs persistent-state magnetic materials that exchange electromagnetic forces with electrically conductive windings to convert electrical energy into mechanical energy, and vice versa. The electric machine 114 has a multiphase, hairpin-wound stator assembly 116 that nests therein and circumscribes a PM-bearing synchronous reluctance rotor assembly 118. While available for use in automotive and non-automotive applications alike, the electric machine 114 of FIG. 2 may be particularly suited for use in a hybrid-electric powertrain as a traction motor (e.g., motor 14 FIG. 1) with an engine (e.g., ICE assembly 12), and to operate in at least an engine-cranking mode, a regenerative-charging mode, and a torque-assist mode. Electric machine 114 may be designed to achieve: a relatively high efficiency, such as at least about 85% efficiency over a calibrated output power and speed range; a relatively high power density (e.g., greater than about 1500 watts per liter) and torque density (e.g., greater than about 5 Newton-meters per liter); a relatively wide peak power range (e.g., about 4 to 6 kilowatts or greater); a maximum speed of at least about 18,000 rpm; a reduced mass and inertia (e.g., for fast dynamic response to user output demands); and to fit into a relatively small packaging space. Innumerable alternative architectures may be employed by the electric machine 114 to meet similar and alternative operating parameters. For instance, FIG. 2 portrays the electric machine 114 with interior magnets arranged in a U-shaped pattern; however, disclosed concepts may be applied to other magnet patterns, such as the V-shaped pattern illustrated in FIG. 3.

With continuing reference to FIG. 2, the stator assembly 116 is coaxial with and surrounds the rotor assembly 118 while maintaining a small airgap 115 therebetween. In accord with the illustrated example, this airgap 115 may be not less than about 0.2 millimeters (mm) and not greater than about 1.0 mm, for example, in order to maximize power output and minimize the number of permanent magnets 120 borne by the rotor assembly 118 to provide a desired power output. The representative stator and rotor assemblies 116, 118 of FIG. 2 are concentrically aligned about a shared longitudinal center axis A of the electric machine 114. The stator assembly 116 has a hollow stator core 126 with a central bore 122 that nests therein the rotor assembly 118. The rotor assembly 118 has a hollow rotor core 128, e.g., that keys, splines, welds, etc., to a motor shaft (e.g., motor output member 29 of FIG. 1). It should be appreciated that a protective motor housing (shown schematically at 31 in FIG. 1) may surround an outer periphery of the stator assembly 116 and can rotatably support the rotor and rotor output shaft of the electric machine 114.

Rotor assembly 118 of FIG. 2 is fabricated with a rotor core 128, which may have a right-circular cylinder geometry with a generally annular shape, for supporting multiple permanent magnets 120 (twenty-four (24) PMs in the illustrated example) that are circumferentially spaced around a central bore 124. Specifically, the rotor core 128 is stamped, precision machined, and assembled with multiple rotor slots 130 arranged in radially spaced barrier layers (e.g., four distinct barrier layers). A first barrier layer 130A of slots 130 may be positioned closest to an inner periphery of the rotor core 128, while a fourth barrier layer 130D of slots 130 may be positioned furthest from the rotor body's inner periphery than the other barrier layers. A second barrier layer 130B may be radially interposed between the first and third barrier layers 130A, 130C, while a third barrier layer 130C may be radially interposed between the second and fourth barrier layers 130B, 130D. For at least some embodiments, only select barrier layers (e.g., the first and third barrier layers 130A, 130C) may house magnets 120, while other select barrier layers (e.g., the second and fourth barrier layers 130B, 130D) do not house magnets 120 and, thus, act as flux barriers. In other embodiments, only one or all of the barrier layers may comprise slots storing therein permanent magnets. The rotor core 128 may be fabricated from metallic disc-shaped laminates, including high-grade steel materials, that are stacked and adhered together to maintain high-speed rotational stress within predetermined limits.

Stator assembly 116 of FIG. 2 is fabricated with a stator core 126, which may also have a right-circular cylinder geometry with a generally annular shape and may have multiple radially aligned, axially elongated, and circumferentially spaced stator slots 132 (e.g., 60 total slots in the illustrated example). Each stator slot 132 extends longitudinally through the stator core 126, parallel to the rotational axis A of the electric machine 114. The stator slots 132 house complementary legs of electrically conductive, multiphase stator windings 134. Stator windings 134—also referred to herein as "hairpin windings"—may be grouped into different sets, each of which may carry an identical number of phases of electrical current, such as three, five, six, or seven phases. In addition, the stator windings 134 may extend axially beyond the longitudinal ends of the stator core 126. A ratio of an outer diameter of the stator core 126 to an axial length of the stator core 126 may be not less than 1.5 and not greater than 3.5, for example, to satisfy packing space constraints for a desired application of the electric machine 114, such as the vehicle powertrain of FIG. 1.

For case of manufacture and simplicity of design, it may be desirable that all of the permanent magnets 120 share an identical, rectangular polyhedron shape. Nevertheless, any one or more or all of the PM bodies may take on innumerable shapes and sizes, including other polyhedral block-type magnets, ring-shaped (annular) magnets, bread-loaf block-type magnets, curved tile magnets, etc. In a non-limiting example, each permanent magnet 120 may have a thickness of about 1.5 mm to 2.5 mm to fit within a slot 130 having complementary dimensions. A total mass of magnet material used by the electric machine 114 (i.e., the mass of all magnets 120) may be about 150 grams to about 250 grams. The permanent magnets 120 of the electric machine 114 may all be fabricated from the same material, such as Neodymium Iron Boron (NdFeB); alternatively, the magnets 120 may employ different materials, such as Samarium Cobalt (SmCo), Aluminum Nickel Cobalt (AlNiCo), or any combination of rare earth magnet materials.

Similar to the permanent magnets 120 of FIG. 2, it may be desirable that all of the multiphase stator windings 134 share an identical construction, including material composition, method of manufacture, and final geometry. Each stator winding 134 may be fabricated from a unitary bar conductor, which is formed into a U-shaped geometry that is defined by a pair of hairpin legs that project from opposing ends of a hairpin crown. The hairpin legs are inserted into the slots 132 of the stator core 126, with each leg extending through a different stator slot 132 such that the hairpin crown (or "end-turn") extends over several of the stator slots 132 (e.g., each crown may extend across three or more slots). These hairpin windings 134 may be inserted in a "staggered" or "interleaved" pattern with respect to adjacent hairpins. Any given stator slot 132 may contain a number of hairpin legs (e.g., four in FIG. 2). Once all of the hairpin windings 134 are inserted into the slots 132 of the stator core 126, the ends of the hairpin legs extending from a longitudinal end of the stator core 126 are bent. Electrical connections are then made to each winding 134.

During operation of the electric machine 114, e.g., in a regenerative-charging mode, the rotor assembly 118 is rotated via the rotor output shaft while the stator assembly 116 is held relatively stationary. In so doing, the permanent magnets 120 are moved past the multiphase stator windings 134; the magnetic field emitted by the permanent magnets 120 generates an electrical current in the windings 134 through electromagnetic induction. This induced electric current may be used to power a load (e.g., recharge traction battery pack 30 of FIG. 1). Conversely, during operation of the electric machine 114, e.g., in an engine-cranking mode, an EV motoring mode, or a torque-assist mode, an electric current is supplied to the stator windings 134 by a suitable power source (e.g., traction battery pack 30). Passing the supplied current through the multiphase stator windings 134 will generate a magnetic field at radially inward ends of stator teeth 136. The magnetic field output from these stator teeth 136 interacts with the permanent magnets 120 in the rotor assembly 118 such that the rotor core 128 and attached shaft rotate in unison to generate a rotary driving force.

During operation of the electric machine 114, the internally mounted permanent magnets 120 may be subjected to a significant amount of motor-borne heat, for example, from rotor bearing friction, air-to-rotor "windage" friction, electrified winding resistance, core hysteresis, etc. To mitigate PM heat, there are disclosed herein direct liquid cooling systems, methods, and devices for directing liquid coolant to the rotor slots and into direct contact with one or more target surfaces of each magnet. The rotor core contains a unique design of internal coolant channels in the end discs and rotor disc stack that may collectively enable coolant to reach all rotor slots and magnets during motor operation. With these designs, coolant may flow across the entire axial length of the rotor core and the rotor slots. Also disclosed are unique Y-shaped coolant grooves that enable coolant to be directed to multiple rotor slots from a single coolant groove by allowing coolant to pool at the interface of the stem and branches and enabling coolant to "spill" into both branches. As shown, Y-shaped coolant grooves with center coolant troughs enable a single coolant groove to supply four (4) or more magnet slots, which reduces packaging space and coolant charge requirements. Magnet temperature in an IPM motor may be reduced by pumping liquid coolant into an inner diameter (ID) coolant feed core of a rotor shaft, out through radial holes in the rotor shaft, through coolant feed grooves in the end discs of the rotor core stack, into and across coolant feed channels coterminous with the PM-bearing rotor slots, and out through coolant exhaust holes in end plates at terminal ends of the stack.

Figure 3:
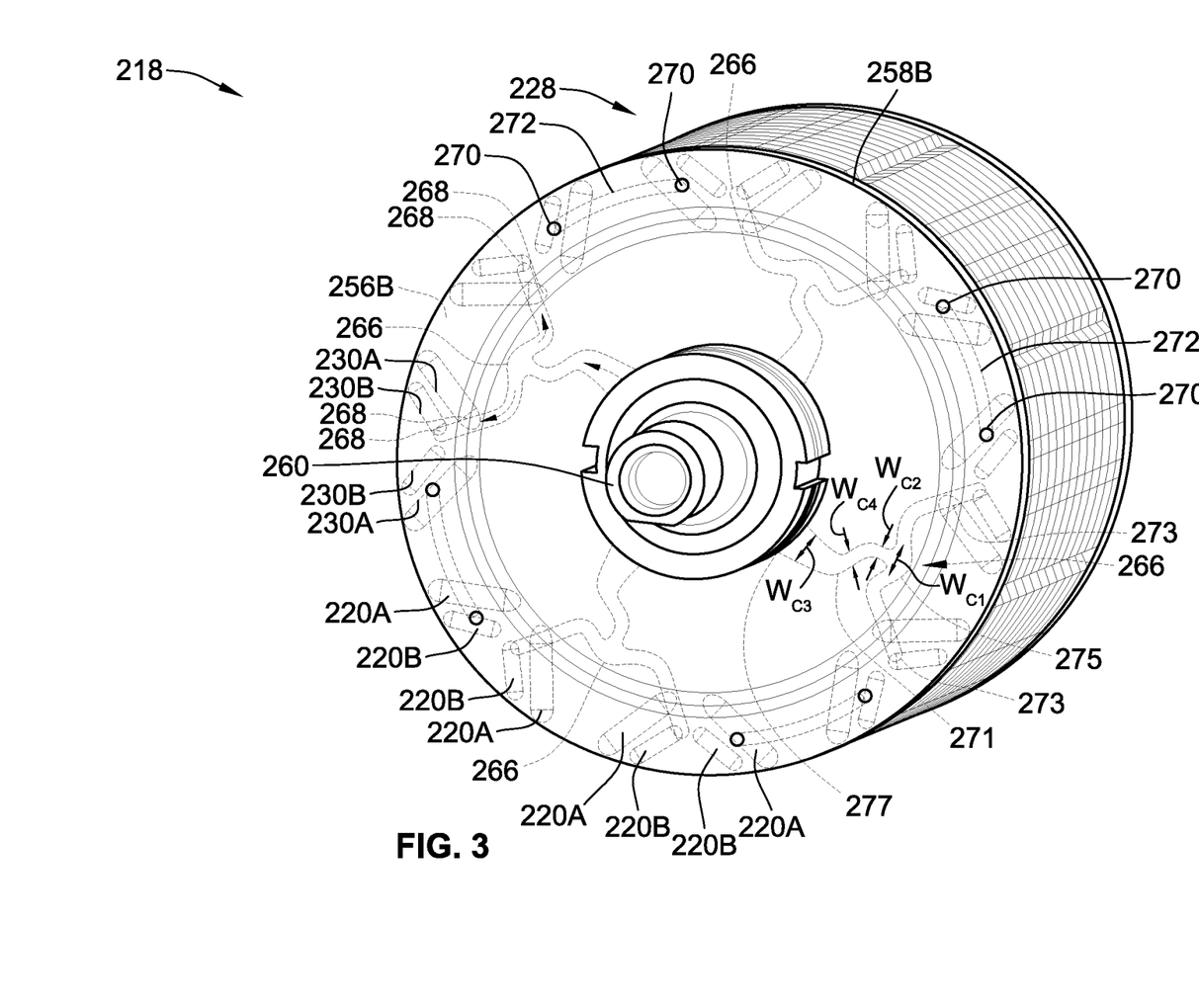
FIG. 3 is an enlarged, perspective-view illustration of a representative IPM rotor assembly with a direct liquid cooling system for cooling internal permanent magnets in accord with aspects of the present disclosure.

Turning next to FIG. 3, there is shown a perspective-view illustration of a representative stacked-laminate IPM rotor assembly 218 that is cooled by direct liquid cooling system 250 (FIG. 4) that is controller-operated to actively circulate a liquid coolant 252, such as an engineered full-immersion coolant or a lubricating dielectric oil (e.g., pumped from transmission oil pan 32). Although differing in appearance, it is envisioned that any of the related features and options described above with respect to the motor assembly 14 and electric machine 114 of FIGS. 1 and 2 can be incorporated, singly or in any combination, into the IPM rotor assembly 218 of FIGS. 3 and 4, and vice versa. As a non-limiting point of similarity, the rotor assembly 218 of FIG. 3 is rotatably mounted (e.g., via a pair of high-speed roller bearings) inside a protective outer housing (e.g., motor housing 31 of FIG. 1) such that the rotor assembly 218 is coaxial with and spaced across an airgap from an electromagnetic stator assembly (e.g., hairpin-wound stator assembly 116). To that end, the rotor assembly 218 of FIG. 3 may be adapted for use in the electric traction motor 14 of FIG. 1, e.g., for automotive applications, or in the electric machine 114 of FIG. 2, e.g., for non-automotive applications.

Figure 4:
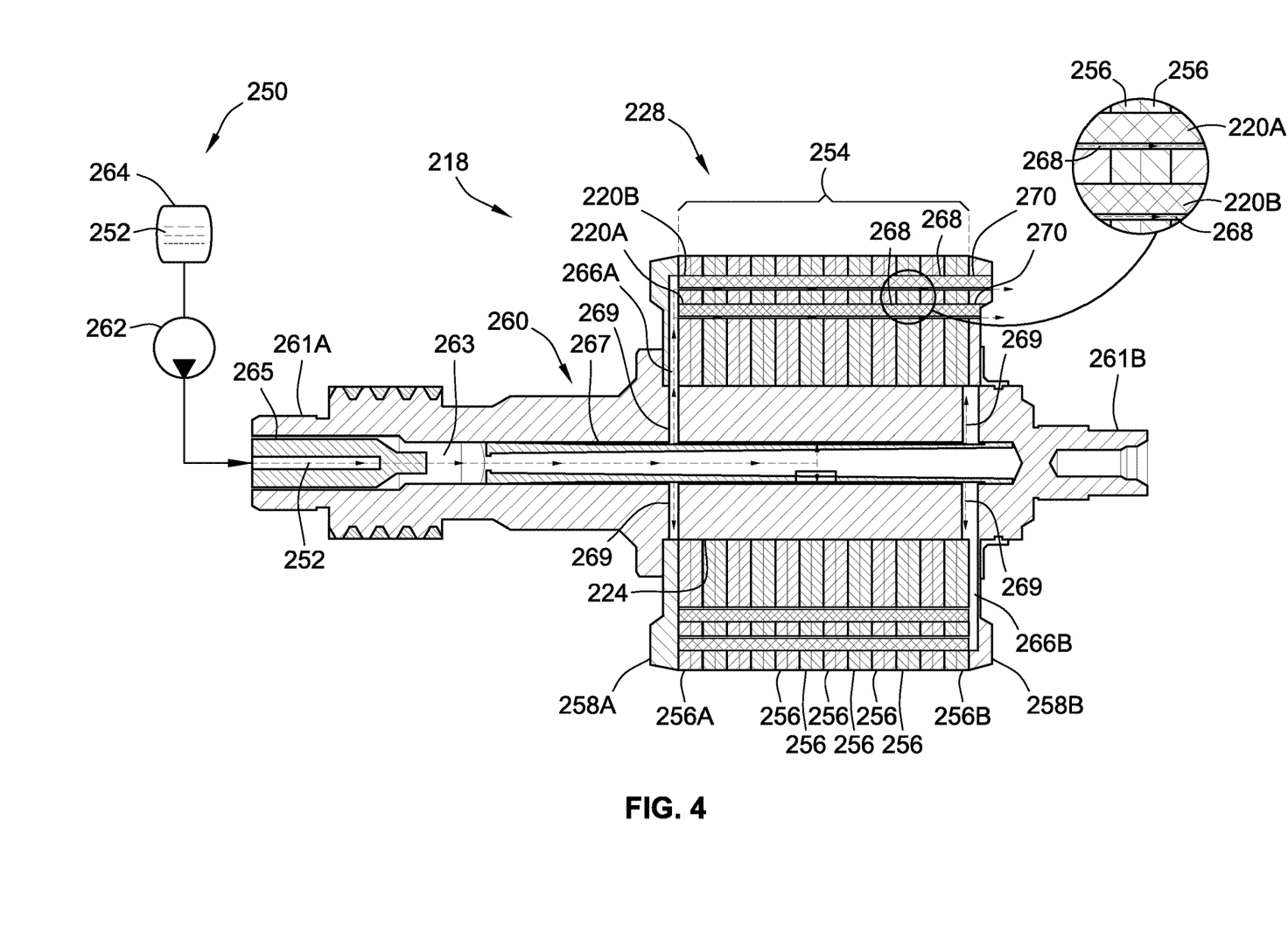
FIG. 4 is sectional, side-view illustration of the representative IPM rotor assembly of FIG. 3 showing the internal coolant conduit architecture for feeding liquid coolant into direct contact with the rotor-borne internal permanent magnets.

The rotor assembly 218 of FIGS. 3 and 4 is generally composed of a hollow, cylindrical rotor core 228 with one or more magnets—sixteen (16) large PMs 220A paired with sixteen (16) small PMs 220B in FIG. 4—that are mounted to the rotor core 228. The rotor core 228 may be fabricated as a multilayer laminate construction that, as the name implies, is typified by a laminated stack 254 of rotor discs 256. While depicted as having a total of twelve (12) rotor disc laminates, the rotor core 228 stack 254 may comprise greater or fewer laminations than what is shown, typically between about 30 to about 70 individual laminations each having an axial thickness of between about 1.5 mm and about 3.0 mm. In this regard, the rotor core 228 may have an axial length of about 40 mm to about 80 mm and an outer diameter of about 120 mm to about 195 mm. Each of the rotor core 228 rotor discs 256 may be fabricated from a suitable ferromagnetic material, such as electrical steel, iron, nickel, cobalt, combinations thereof, or the like. Annular endplates 258A and 258B may be pressed against opposing ends of the laminate stack 254 to retain the laminations in place during operation of the electric machine. When stacked and operatively aligned, the rotor discs 256 collectively define through the rotor core 228 multiple axially elongated rotor slots—sixteen (16) large slots 230A paired with sixteen (16) small slots 230B in FIG. 3—each securing therein a respective one of the permanent magnets 220A, 220B.

FIG. 4 illustrates a bore-mounted rotor shaft 260 (also referred to herein as "motor shaft" for electric motor applications) that is splined, keyed, or otherwise drivingly connected to the rotor core 228 to thereby rotate in unison with the rotor assembly 218. In accord with the illustrated example, the rotor shaft 260 is inserted into and projects outward from open ends of a central bore 224 that extends axially through the laminated stack 254 of rotor discs 256. The rotor shaft 260 may be rotatably supported on high-speed axial roller bearings (not shown) that seat on rotor shaft bearing journals 261A and 261B and align the rotor assembly 218 with respect to its mating stator assembly while enabling rotation of the rotor 218 and shaft 260, i.e., to transmit and/or receive torque. An axially elongated coolant feed core 263 is formed or machined into the center of the rotor shaft 260. The shaft core 263 is shown in FIG. 4 as a blind-type hole with an open proximal end, which extends through a proximal end of the shaft 260, and a closed distal end, which terminates axially inward from a distal end of the shaft 260. Press-fit into the open proximal end of the coolant feed core 263 is a coolant supply nozzle 265 through which liquid coolant 252 is pumped via a coolant pump 262 from a coolant tank 264 into the rotor shaft 260. A coolant flow split tube 267 is secured inside the coolant feed core 263, fluidly downstream from the coolant supply nozzle 265; the split tube 267 facilitates the dividing and dissemination of coolant 252 through radial feed holes 269 in the rotor shaft 260.

To transmit liquid coolant 252 from the cooling system 250 into direct contact with the rotor-mounted PMs 220A, 220B, the rotor core 228 contains one or more radially elongated rotor feed grooves 266 that transfer coolant 252 from the rotor shaft 260 to the rotor slots 230A, 230B. By way of non-limiting example, the rotor assembly 218 of FIG. 3 may include eight (8) rotor feed grooves 266 with four (4) grooves 266 recessed into and circumferentially spaced equidistant from one another around each axial end surface of the rotor core 228. For laminate-stack constructions, a front (first) end disc 256A at a front (first) end of the rotor laminate stack 254 is formed or machined with a front (first) set of coolant feed grooves 266A that is recessed into, circumferentially spaced around, and extend radially outward along a forward-facing (first) surface of the front (first) end disc 256A. In the same vein, a rear (second) end disc 256B at a rear (second) end of the rotor stack 254 is formed or machined with a rear (second) set of feed grooves 266B that is recessed into, circumferentially spaced around, and extend radially outward along a rearward-facing (second) surface of the rear (second) end disc 256B. For simplicity of design and manufacture, it may be desirable that the two end discs 256A, 256B be structurally identical to each other (as shown in FIG. 3) but stacked with their respective groove-bearing surfaces facing in opposite directions. A front (first) end plate 258A abuts the groove-bearing surface of the front (first) end disc 256A and covers the open axial faces of the feed grooves 266A, whereas a rear (second) end plate 258B abuts the groove-bearing surface of the rear (second) end disc 256B and covers the open axial faces of the feed grooves 266B. Each coolant feed groove 266 may fluidly connect to a respective coolant feed hole 269 of the rotor shaft 260 to thereby receive liquid coolant 252 from the direct liquid cooling system 250.

In order to enable a single coolant feed groove 266 to supply liquid coolant 252 to multiple rotor slots 230A, 230B, each feed groove 266 may have a Y-shaped geometry with an elongated stem 271 that is integral with a pair of elongated branches 273. The branches 273 project radially outward from a radially outer (top) end of the stem 271, but terminate radially inward from an outer circumference of the rotor core 228. A radially inner (bottom) end of each stem 271, opposite that of the branches 273, aligns with and fluidly couples to one of the feed holes 269 in the rotor shaft 260 to receive therefrom the liquid coolant 252. At radially outer ends of the feed grooves 266, each branch 273 fluidly connects to one or more respective rotor feed channels 268 and, thus, one or more respective rotor slots 230A, 230B. In accord with the example illustrated in FIG. 3, the branches 273 may project in opposite direction from each other and thereby cooperatively define a W-shaped profile. Each branch 273 may project at an oblique angle from the stem 271 (e.g., approximately 40-70 degrees clockwise or counterclockwise from a linear radial line extending from the center rotational axis through the radially outer end of the stem 271). As shown, the stem 271 has an S-shaped curvilinear geometry whereas the branches 273 each has an L-shaped arcuate geometry.

To ensure that liquid coolant 252 is distributed through all branches 273 and, thus, to all coolant feed channels 268 during rotation of the rotor assembly 218, each coolant feed groove 266 may incorporate an integral coolant trough 275 that is interposed between and fluidly connects the stem 271 and branches 273. The coolant trough 275 may have an enlarged (first) lateral width $W_{C1}$ that is greater than a narrow (second) lateral width $W_{C2}$ of the radially outer end of the stem 271. This enlarged width creates a volumetric expansion in the coolant flow path that allows the coolant 252 to reduce speed and pool in the trough 275; as the rotor assembly 218 spins, centrifugal forces cause the coolant 252 to spill from both sides of the trough 275 into the two branches 273, which may be narrower in width than the trough 275. It is envisioned that the coolant feed groove(s) 266 may also or alternatively be integrated into the endplates 258A, 258B.

In order to facilitate the transfer of coolant 252 from the rotor shaft 260 into the rotor assembly 218, each of the coolant feed grooves 266 may incorporate an integral widened base 277 at the radially inner end of the stem 271 and an integral column that fluidly connects the base 271 to the radially outer end of the stem 271. To progressively increase fluid speed of coolant 252 entering the coolant groove 266, the base 277 may have a variable (third) lateral width $W_{C3}$ that is greater than a fixed (fourth) lateral width $W_{C4}$ of the stem column. The lateral width $W_{C3}$ of the base 277 may progressively decrease in a radially outward direction to create a fluid construction that amplifies fluid flow speed. As shown, the lateral width $W_{C4}$ of the stem's column may be substantially equal to the lateral width $W_{C2}$ of the stem's radially outer end, and the lateral width of the branches 273 may be substantially equal to the lateral width $W_{C2}$ of the stem's radially outer end. In the above discussion, each "lateral width" extends crosswise in the circumferential direction with respect to the axial end face of the rotor core 228.

With collective reference to both FIGS. 3 and 4, each coolant feed groove 266 is fluidly coupled to at least one or, as shown, four (4) axially elongated coolant feed channels 268 that transport liquid coolant 252 into direct contact with one or more target surfaces of each magnet 220A, 220B. For at least some applications, the rotor assembly 218 may employ a dedicated feed channel 268 for each PM 220A, 220B (e.g., thirty-two (32) feed channels in FIG. 3). To that end, each feed channel 268 may adjoin and extend coterminous with a respective one of the rotor slots 230A, 230B. Similar to the rotor slots 230A, 230B, the coolant feed channels 268 are circumferentially spaced around and extend entirely through the rotor core 228. One fore-aft (first) set of the rectilinear feed channels 268 extends axially through the rotor stack 254 and fluidly connects to the first set of feed grooves 266A to transmit coolant 252 in a left-to-right (first) direction. By comparison, another fore-aft (second) set of the rectilinear feed channels 268 extends axially through the rotor stack 254 and fluidly connects to the second set of feed grooves 266B to transmit coolant 252 in a right-to-left (second) direction, which is opposite that of the first feed grooves 266A.

To evacuate liquid coolant 252 that has been heated through direct physical contact with the PMs 220A, 220B, each of the endplates 258A, 258B includes one or more coolant exit holes 270 through which spent coolant 252 is expelled from the rotor assembly 218. As shown, there are eight (8) coolant exit holes 270 (i.e., one for each magnet pole) that are circumferentially spaced around and extend axially through each endplate 258A, 258B. A discrete coolant manifold channel 272 may connect each neighboring pair of coolant exit holes 270 to allow coolant 252 to simultaneously flow out of four (4) of the coolant feed channels 268 (e.g., depending on a rotation direction of the rotor assembly 218, coolant 252 may accumulate in the manifold channel 272 and exit through one of the two interconnected exit holes 270. The manifold channels 272 may be formed in the same surface as the coolant feed grooves 266. It should be appreciated that the rotor assembly 218 of FIGS. 3 and 4 may incorporate greater or fewer coolant feed grooves and coolant feed channels with similar or alternative configurations and dimensions to that which are shown in the drawings without departing from the intended scope of this disclosure.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. An electric machine cooled by a liquid coolant circulated via a direct liquid cooling system, the electric machine comprising:
a housing;
a stator assembly located inside the housing and including a stator core and an electromagnetic winding mounted to the stator core; and
a rotor assembly rotatably attached to the housing coaxial with and spaced from the stator assembly, the rotor assembly including a rotor core and a magnet mounted to the rotor core, the rotor core defining therein a radially elongated rotor feed groove fluidly connected to an axially elongated rotor feed channel, the rotor feed groove configured to fluidly connect to the direct liquid cooling system to receive therefrom the liquid coolant, and the rotor feed channel transporting the liquid coolant into direct contact with a target surface of the magnet,
wherein the rotor core includes a rotor stack of rotor discs with a first end disc at a first end of the rotor stack, and wherein the rotor feed groove includes a first set of feed grooves recessed into, circumferentially spaced around, and extending radially outward along a first surface of the first end disc.

2. The electric machine of claim 1, wherein at least one feed groove in the first set of feed grooves has a Y-shaped geometry with a stem and a pair of branches projecting from a radially outer end of the stem, the stem having a radially inner end opposite the radially outer end through which the liquid coolant is fed into the rotor assembly, and wherein the rotor feed channel includes multiple feed channels with each of the branches fluidly connected to a respective one or more of the feed channels.

3. The electric machine of claim 2, wherein the at least one feed groove further includes a coolant trough interposed between and fluidly connecting the stem and the branches, the coolant trough having a first lateral width greater than a second lateral width of the radially outer end of the stem.

4. The electric machine of claim 3, wherein the stem further includes a base at the radially inner end and a column connecting the base to the radially outer end of the stem, the base having a third lateral width greater than a fourth lateral width of the column.

5. The electric machine of claim 2, wherein the branches project at an oblique angle from the radially outer end of the stem.

6. The electric machine of claim 2, wherein the stem is curvilinear and the branches are arcuate.

7. The electric machine of claim 1, wherein the rotor feed channel includes a plurality of coolant feed channels circumferentially spaced around and extending entirely through the rotor core.

8. The electric machine of claim 1, wherein the rotor core further includes a second end disc at a second end of the rotor stack, and the rotor feed groove further includes a second set of feed grooves recessed into, circumferentially spaced around, and extending radially outward along a second surface of the second end disc.

9. The electric machine of claim 8, further comprising first and second annular end plates abutting the first and second end discs, respectively, and covering open axial faces of the first and second sets of feed grooves, respectively.

10. The electric machine of claim 9, wherein the rotor feed channel includes first and second sets of rectilinear feed channels extending axially through the rotor stack, the first set of rectilinear feed channels being fluidly connected to the first set of feed grooves, and the second set of rectilinear feed channels being fluidly connected to the second set of feed grooves.

11. The electric machine of claim 1, wherein the magnet includes multiple permanent magnets, the rotor core defines therethrough multiple axially elongated rotor slots each securing therein a respective one of the permanent magnets, and the rotor feed channel includes multiple feed channels each fluidly connected to and coterminous with a respective one of the rotor slots.

12. The electric machine of claim 1, further comprising a rotor shaft drivingly connected to the rotor core to rotate in unison with the rotor assembly, the rotor shaft defining therein an axially elongated coolant feed core through which the liquid coolant is transmitted into the rotor assembly, the rotor feed groove being fluidly connected to the coolant feed core.

13. A motor vehicle, comprising:
a vehicle body;
a plurality of road wheels rotatably attached to the vehicle body;
a direct liquid cooling system attached to the vehicle body and operable to circulate a liquid coolant; and
a traction motor attached to the vehicle body and operable to drive one or more of the road wheels to thereby propel the motor vehicle, the traction motor including:
a motor housing attached to the vehicle body;
a stator assembly rigidly mounted inside the motor housing, the stator assembly including a plurality of electromagnetic windings and a cylindrical stator core, the cylindrical stator core including a hollow center and a plurality of axially elongated stator slots through which extend the electromagnetic windings; and
a rotor assembly rotatably mounted inside the motor housing and located in the hollow center of the stator core coaxial with and separated by an airgap from the stator assembly, the rotor assembly including a plurality of permanent magnets and a cylindrical rotor core, the cylindrical rotor core including a hollow center and a plurality of axially elongated rotor slots each mounting therein a respective one of the permanent magnets, the rotor core defining therein a plurality of radially elongated rotor feed grooves fluidly connected to a plurality of axially elongated rotor feed channels, the rotor feed grooves being fluidly connected to the direct liquid cooling system to receive therefrom the liquid coolant, and each of the rotor feed channels transporting the liquid coolant to a respective one of the rotor slots and into direct contact with a target surface of the permanent magnet contained in the respective one of the rotor slots,
wherein the rotor core includes a rotor stack of rotor discs with a first end disc at a first end of the rotor stack, and wherein the rotor feed grooves include a first set of feed grooves recessed into, circumferentially spaced around, and extending radially outward along a first surface of the first end disc.

14. A method of assembling an electric machine cooled by a liquid coolant circulated via a direct liquid cooling system, the method comprising:
receiving a housing of the electric machine;
mounting a stator assembly inside the housing, the stator assembly including a stator core and an electromagnetic winding mounted to the stator core;

rotatably mounting a rotor assembly inside the housing such that the rotor assembly is coaxial with and spaced from the stator assembly, the rotor assembly including a rotor core and a magnet mounted to the rotor core, the rotor core defining therein a radially elongated rotor feed groove fluidly connected to an axially elongated rotor feed channel, the rotor core including a rotor stack of rotor discs with a first end disc at a first end of the rotor stack, and the rotor feed groove including a first set of feed grooves recessed into, circumferentially spaced around, and extending radially outward along a first surface of the first end disc; and fluidly connecting the rotor feed groove to the direct liquid cooling system to receive therefrom the liquid coolant, wherein the rotor feed channel transports the liquid coolant into direct contact with a target surface of the magnet.

15. The method of claim 14, wherein at least one feed groove in the first set of feed grooves has a Y-shaped geometry with a stem and a pair of branches projecting from a radially outer end of the stem, the stem having a radially inner end opposite the radially outer end through which the liquid coolant is fed into the rotor assembly, and wherein the rotor feed channel includes multiple feed channels with each of the branches fluidly connected to a respective one or more of the feed channels.

16. The method of claim 15, wherein the at least one feed groove further includes a trough interposed between and fluidly connecting the stem and the branches, the trough having a first lateral width greater than a second lateral width of the radially outer end of the stem.

17. The method of claim 14, wherein the rotor core further includes a second end disc at a second end of the rotor stack, and the rotor feed groove further includes a second set of feed grooves recessed into, circumferentially spaced around, and extending radially outward along a second surface of the second end disc.

18. The method of claim 14, wherein the magnet includes multiple permanent magnets, the rotor core defines therethrough multiple axially elongated rotor slots each securing therein a respective one of the permanent magnets, and the rotor feed channel includes multiple feed channels each fluidly connected to and coterminous with a respective one of the rotor slots.

19. The method of claim 14, wherein the rotor assembly further includes a first end plate abutting the first end disc and covering the first set of feed grooves.

20. The method of claim 14, wherein the rotor feed channel includes a first set of rectilinear feed channels circumferentially spaced around and extending axially through the rotor stack, the first set of rectilinear feed channels being fluidly connected to the first set of feed grooves.

* * * * *